United States Patent
Beadles et al.

[11] Patent Number: 6,005,536
[45] Date of Patent: Dec. 21, 1999

[54] CAPTIONING GLASSES

[75] Inventors: Robert L. Beadles, Durham, N.C.; C. Eric Kirkland, Rockville, Md.

[73] Assignee: National Captioning Institute, Vienna, Va.

[21] Appl. No.: 08/586,240

[22] Filed: Jan. 16, 1996

[51] Int. Cl.[6] .................................................. G09G 5/00
[52] U.S. Cl. ...................... 345/7; 345/8; 345/9; 348/115; 359/631; 359/632
[58] Field of Search ....................... 345/7, 8, 9; 353/122; 359/630, 631, 13, 632; 348/115

[56] References Cited

U.S. PATENT DOCUMENTS

| | | |
|---|---|---|
| 3,936,605 | 2/1976 | Upton . |
| 4,275,385 | 6/1981 | White . |
| 4,292,474 | 9/1981 | Morrell et al. . |
| 4,317,232 | 2/1982 | Pickett . |
| 4,317,233 | 2/1982 | Kunde et al. . |
| 4,317,234 | 2/1982 | Kunde et al. . |
| 4,414,431 | 11/1983 | McCartney ................................ 381/48 |
| 4,456,793 | 6/1984 | Baker et al. . |
| 4,562,463 | 12/1985 | Lipton . |
| 4,633,498 | 12/1986 | Warnke et al. . |
| 4,636,866 | 1/1987 | Hattori . |
| 4,673,266 | 6/1987 | Fiumi . |
| 4,753,514 | 6/1988 | Kubik . |
| 4,757,714 | 7/1988 | Purdy et al. . |
| 4,806,011 | 2/1989 | Bettinger . |
| 4,859,994 | 8/1989 | Zola et al. . |
| 4,870,486 | 9/1989 | Nakagawa et al. . |
| 4,902,083 | 2/1990 | Wells . |
| 4,907,860 | 3/1990 | Noble . |
| 4,934,773 | 6/1990 | Becker . |
| 4,969,714 | 11/1990 | Fournier, Jr. et al. ................... 353/174 |
| 5,029,216 | 7/1991 | Jhabvala et al. ....................... 381/68.1 |
| 5,146,502 | 9/1992 | Davis ....................................... 381/43 |
| 5,162,828 | 11/1992 | Furness et al. . |
| 5,224,198 | 6/1993 | Jachimowicz et al. . |
| 5,231,379 | 7/1993 | Wood et al. ............................... 345/8 |
| 5,293,584 | 3/1994 | Brown et al. ......................... 385/2.86 |
| 5,475,798 | 12/1995 | Handlos ................................. 704/277 |
| 5,543,851 | 8/1996 | Chang ................................... 348/468 |
| 5,648,789 | 7/1997 | Beadles et al. ............................. 345/8 |
| 5,683,297 | 11/1997 | Raviv et al. ............................. 463/34 |
| 5,696,521 | 12/1997 | Robinson et al. ......................... 345/8 |
| 5,805,120 | 9/1998 | Yanada et al. ............................. 345/7 |
| 5,867,817 | 2/1999 | Catallo et al. .......................... 704/255 |

FOREIGN PATENT DOCUMENTS

WO88/02494  2/1994  WIPO .

OTHER PUBLICATIONS

Ivan E. Sutherland, "A head-mounted three dimensional display*," Fall Joint Computer Conference, pp. 757-763 (1968).
Glenn Rifkin, *The New York Times*, "Courting a Deaf Movie Audience With Caption Devices", p. 11 (Nov. 21, 1993).
*Consumer Reports*, "Virtual Vision: A view of Things to Come?", p. 764, (Dec. 1993).

*Primary Examiner*—Dennis-Doon Chow
*Assistant Examiner*—Amr Awad
*Attorney, Agent, or Firm*—Banner & Witcoff, Ltd.

[57] ABSTRACT

A wearable display device displays a sequence of words into the field of view of a person wearing the device in order to communicate information to the person, such as captions for hearing-impaired persons or translations of speech spoken by another person. Various embodiments of the device include an eyeglass frame configured to be worn by the person, a housing mounted to the eyeglass frame, including a circuit for receiving a signal containing the sequence of words, a display for displaying the sequence of words received by the circuit, a mirror mounted to reflect the displayed sequence of words downwardly through the housing, and a lens disposed in the path of the mirror to magnify the displayed sequence of words downwardly reflected by the mirror, and a partially reflective beamsplitter, mounted to the housing and extending downwardly over an eye of the person, for receiving the downwardly reflected sequence of words and projecting them into the field of view of the person. The display itself may be moved along a recess in the housing to focus the words onto the beamsplitter. A curved beamsplitter may be used instead of a lens to magnify the words and provide optical correction.

47 Claims, 4 Drawing Sheets

CAPTIONING GLASSES

This invention was made with United States Government support under a project entitled "Development of a Personal Caption Display Prototype to Benefit Students Who Are Deaf", awarded by the U.S. Department of Education under the Assistive Technology for Deaf/Hard of Hearing program, CFDA 84.180J. The United States Government may have certain rights in this invention.

BACKGROUND OF THE INVENTION

1. Technical Field

This invention relates generally to devices which project information comprising alphanumeric or graphical representations into the field of view of a person to assist the person in viewing a presentation. Such projections, for example, have utility in providing captioning data, teletext data, or educational information to the person. More specifically, the invention provides a device which can be used in conjunction with various types of presentations and performances, such that for example a hearing-impaired wearer can observe a presentation or performance while simultaneously being presented the projected visual representation of the aural information typically as a series of words. The term "hearing impaired" will be understood to include physical or situational impairment (e.g., as might be encountered where high ambient noise levels are present).

2. Related Information

Conventional devices which provide visual cues to hearing impaired persons are well known. For example, U.S. Pat. No. 3,463,885 to Upton discloses a display which is mounted upon a pair of spectacles to be worn by a hearing impaired person. Such devices have been found to be primitive and unsatisfactory for most people. Moreover, because of the limited display capabilities of such devices, the amount of information which can be conveyed is necessarily limited. Accordingly, there remains a need to provide sufficient information within a wearer's field of view which can be synchronized with a performance or presentation.

So-called "heads-up displays" for pilots and the like are known. One exemplary device, described in U.S. Pat. No. 5,162,828 to Furness et al., provides a wearable apparatus for displaying parametric information. However, such systems are bulky, complicated and expensive, and are generally limited to providing parametric information such as speed, range, fuel, and the like. Such devices fail to provide sequences of several words which can be synchronized to a performance or presentation being viewed by the wearer. Other considerations such as the aesthetic undesirability of using a bulky heads-up display in a classroom, movie theater or the like also prevents such devices from being commercially acceptable. Therefore, conventional heads-up displays fail to address the needs of hearing-impaired persons or those wishing to view a performance or presentation in a language other than that in which the presentation is being made.

As a result of the above and other problems and disadvantages, conventional devices have heretofore been inadequate, expensive and unwieldy.

SUMMARY OF THE INVENTION

The present invention solves the aforementioned problems by providing an improved wearable display device which projects a plurality of words into the field of view of the wearer, wherein the words are synchronized to a performance or presentation that is viewed by the wearer. More particularly, the present invention contemplates providing a wearable housing containing an electronic display for displaying a sequence of words, projecting means for projecting the sequence of words into the field of view of the wearer, and an eyeglass frame onto which the wearable housing is mounted. In various embodiments, the projecting means includes a mirror for reflecting the displayed sequence of words, a lens for focusing and magnifying the reflected sequence of words, and a partially reflective beamsplitter mounted in front of at least one eye of the wearer. In various other embodiments, the function of the magnifying lens may be performed by providing a beamsplitter having a curved surface. Various other objects and advantages of the present invention will become apparent through the following detailed description, figures, and the appended claims.

DETAILED DESCRIPTION OF THE PREFERRED EMBODIMENTS

Figure 1A:
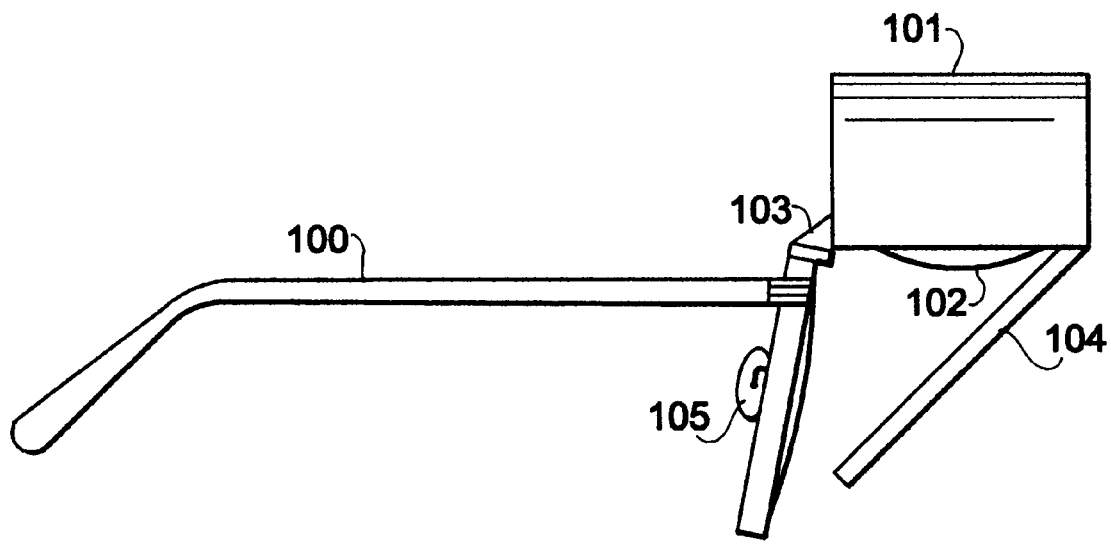
FIG. 1A shows a side view of a device incorporating various features of the present invention, including a wearable housing 101 and a partially reflective beamsplitter 104.

FIG. 1A shows a side view of a device incorporating various principles of the present invention. An eyeglass frame 100 from which the lenses have been optionally removed includes nose pads 105 for supporting the frame on a wearer's nose. A wearable display housing 101 containing various electronic and display components is securely mounted onto eyeglass frame 100 by way of a mounting bracket 103. The display housing may be constructed of lightweight plastic, for example. A magnifying lens 102 is disposed on the bottom of display housing 101 over a hole (not shown) such that words projected through the hole and lens are reflected off partially reflective beamsplitter 104, which is mounted at approximately a 45 degree angle from housing 101.

In various embodiments, beamsplitter 104 covers a single eye of the wearer, preferably the so-called "dominant" eye. A display circuit within housing 101 causes a sequence of words to be projected onto beamsplitter 104, preferably near the bottom or top of the field of view so as to minimize interference with the wearer's vision. It will be appreciated that beamsplitter 104 may be mounted to eyeglass frame 100 or to another component rather than to housing 101. Various optics principles which describe how a sequence of words may be focused and presented into a wearer's field of view are explained in U.S. application Ser. No. 07/769,849, entitled "Method and Apparatus for Closed Captioning at a Performance", naming Robert Beadles as an inventor, the aforesaid application hereby incorporated by reference.

Figure 1B:
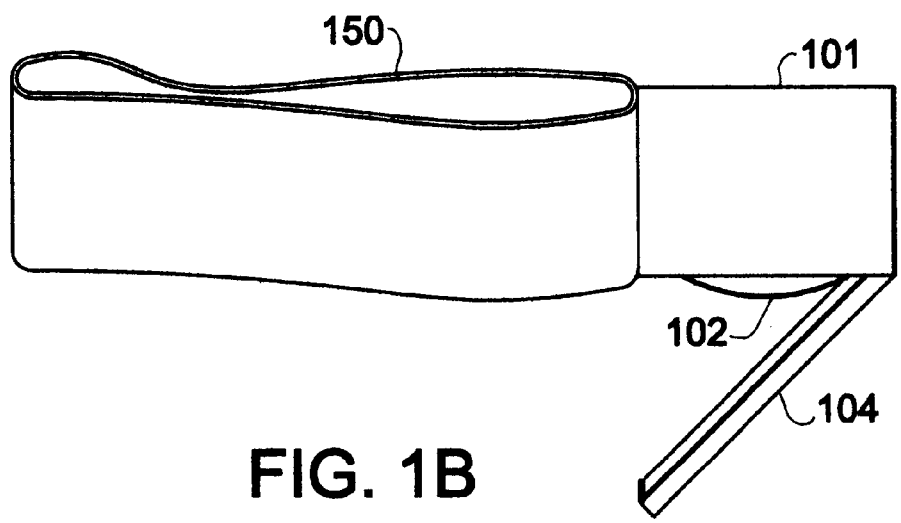
FIG. 1B shows an embodiment of a wearable device which uses a headband 150 to support the display components.

FIG. 1B shows an alternate embodiment for mounting the housing 101. Instead of an eyeglass frame 100 as shown in FIG. 1A, a headband 150 may be used for supporting the display components on a wearer's head. Such an embodiment may provide a more aesthetically acceptable configuration for wearers who do not normally wear glasses. As another example, such a configuration may be used to provide captions for museum visitors, such that visitors are provided with a "guided tour" of the museum in captions presented on beamsplitter 104.

Figure 2:
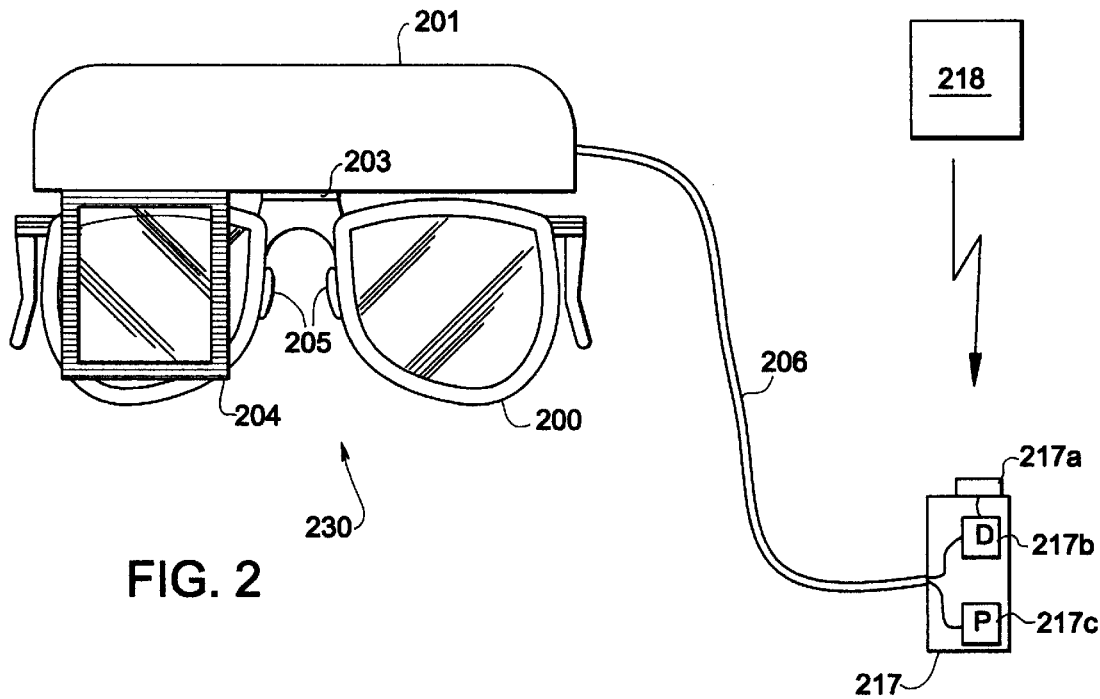
FIG. 2 shows a front view of a device incorporating various principles of the present invention.

FIG. 2 shows a front view of a device incorporating various principles of the invention. Corresponding components in the figures have been given similar reference numerals; for example, wearable display housing 201 in FIG. 2 corresponds to wearable display housing 101 in FIG. 1, and so forth.

As shown in FIG. 2, wearable display device 230 includes various components. Display housing 201 is securely mounted to eyeglass frame 200 by way of a mounting bracket 203. The shape and size of housing 201 may be selected to provide an aesthetically pleasing configuration to allow the device to be worn in public. Nose pads 205 support the entire apparatus on the wearer's face. A cable 206 may be used to provide power and transmit synchronized words to a circuit contained in housing 201, although the device may be battery powered and synchronization circuitry may instead be incorporated into housing 201. A partially reflective beamsplitter 204 covers one of the wearer's eyes, allowing the wearer to substantially see through the apparatus while reflecting a sequence of words into the field of view of the wearer.

Additionally, a wearable control unit 217 may be used to house various electronics components such as a infrared or wireless receiver 217a, decoder/video generator 217b, and a power supply 217c. A transmitter 218 may be used to transmit sequences of words, such as captions, to wearable control unit 217 from a nearby location by infrared or other means such as radio communication.

Figure 3:
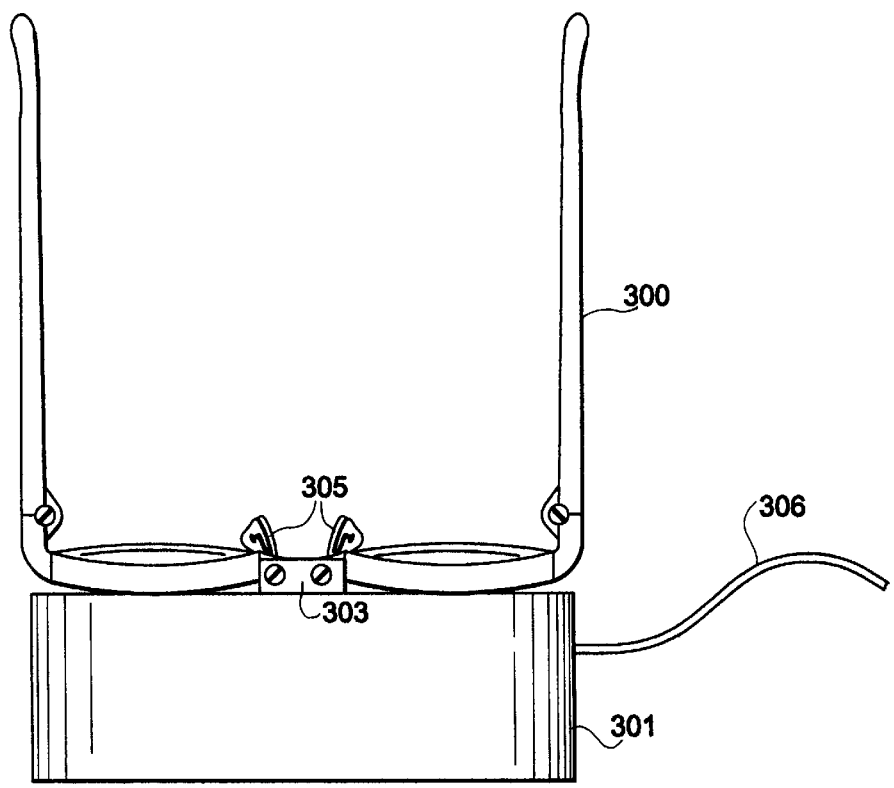
FIG. 3 shows a top view of a device according to various principles of the invention.

FIG. 3 shows a top view of the device shown in FIGS. 1 and 2. As seen in FIG. 3, mounting bracket 303 may be used to securely fasten display housing 301 to the eyeglass frame 300.

Figure 4:
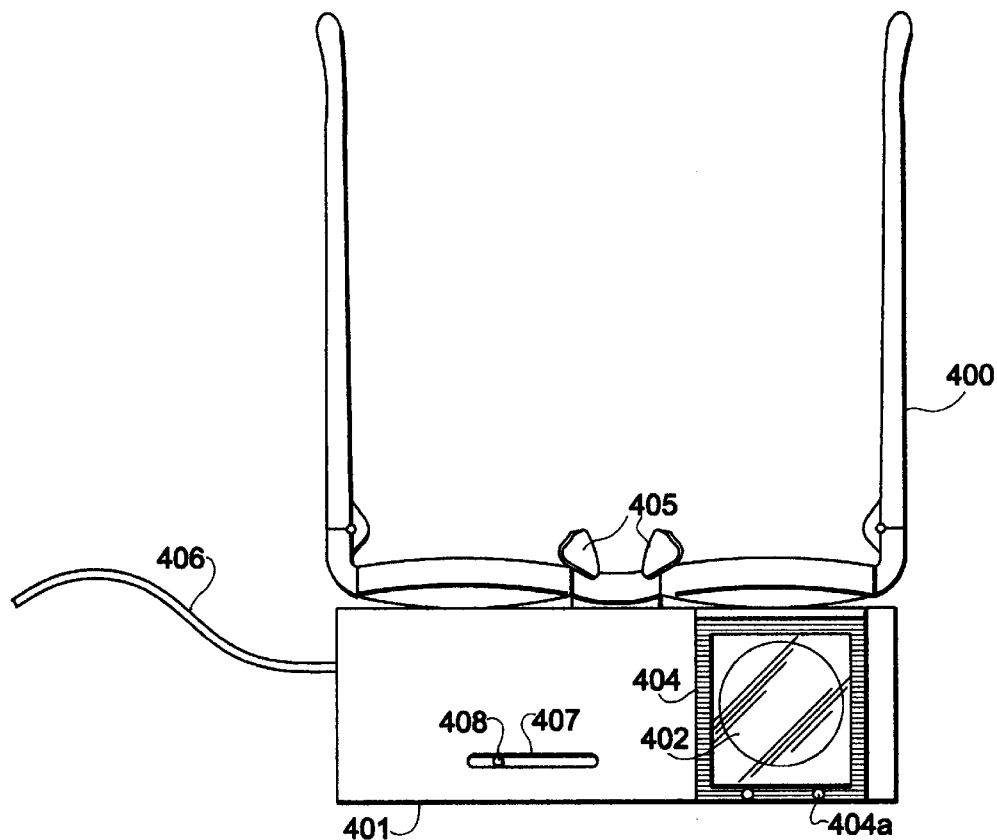
FIG. 4 shows a bottom view of a device according to various principles of the invention.

FIG. 4 shows a bottom view of the device shown in FIGS. 1 to 3. Display housing 401 preferably includes an opening 402 beneath partially reflective beamsplitter 404 over which a magnifying lens is mounted. Beamsplitter 404 may be mounted to housing 401 at the front of the housing (i.e., away from the viewer) by way of mounting screws 404a or the like. A recess path 407 provides a means for adjusting and focusing the displayed words by moving a knob 408, as shown in more detail in FIG. 5. Although the device shown in FIG. 4 is arranged for a wearer having right-eye dominance, it will be appreciated that the arrangement would be reversed for a wearer having left-eye dominance.

Figure 5:
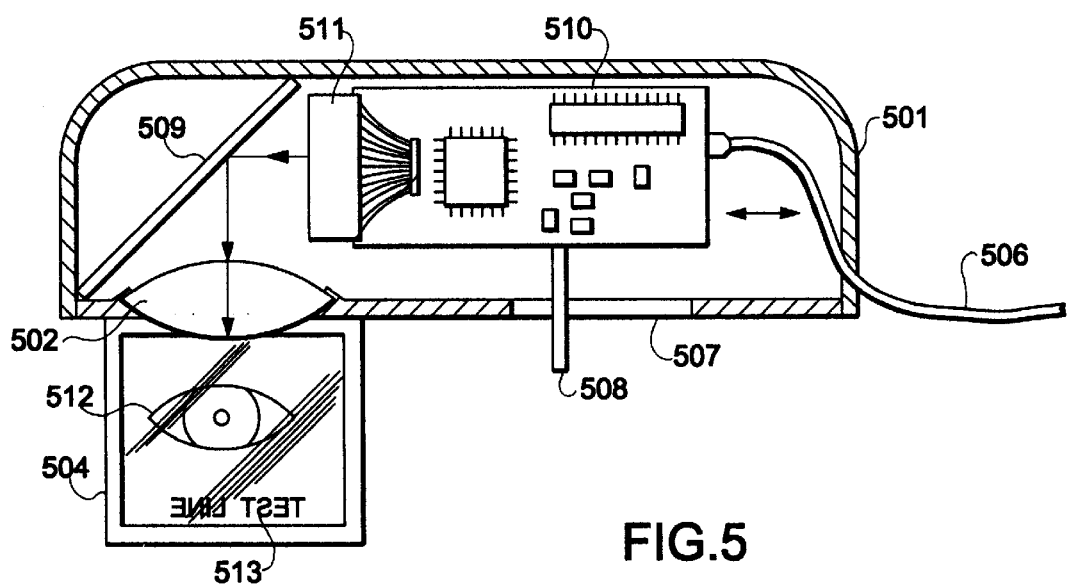
FIG. 5 shows how various display components of the invention may be arranged to display a sequence of words 513 into the field of view of the wearer.

FIG. 5 shows how various optical and display components may be arranged to provide a sequence of words into the wearer's field of view. Housing 501 includes, in various embodiments, a circuit board 510 which couples to cable 506. Circuit board 510 includes various components needed to control a very small display 511 on which the sequence of words appear. Display 511 may comprise any of various types of displays such as LCD or LED devices having a high pixel density, e.g., 400×200 pixels for a 0.7-inch diagonal display. Such displays are commercially available in a small size, including the LCX003BK display manufactured by Sony Electronics, Inc. Although a monochrome display is generally believed to be sufficient for displaying sequences of words, a multi-color display could instead be used to enhance or augment various display features.

Display 511 displays a sequence of words, such as 2 to 10 words, in a one to four line format. In various embodiments, the words are transmitted in video format over cable 506 (i.e., any synchronization, decoding and formatting are performed before transmitting the video over cable 506), but additional circuitry could of course be incorporated into housing 501 to perform these functions. Words displayed on display 511 are reflected off mirror 509 and through lens 502 to beamsplitter 504, which covers the wearer's eye 512. As seen in FIG. 5, the sequence of words 513 is preferably formatted to appear near an edge of the beamsplitter so as to minimize interference with the wearer's vision.

Circuit board 510 is shown mounted on a post 508 which moves in recess path 507, such that the display can be slidably positioned along the projection path. Such movement allows the displayed words to be focused on beamsplitter 504. As can be clearly seen in FIG. 5, the display 511 faces in a direction perpendicular to and laterally transverse to the wearer's line of sight, which extends from the wearer's eye 512 out of FIG. 5. Accordingly, the projection path from the display 511 to the mirror 509 is also perpendicular and laterally transverse to the wearer's line of sight. As is also shown in the figures, the projection path from the mirror 509 to the beamsplitter 504 is generally vertical to downwardly project the sequence of words 513 onto the beamsplitter 504. The recess path 507 in the housing 501 also extends in a direction laterally transverse and perpendicular to the wearer's line of sight so the display 511 is movable along a path laterally transverse and perpendicular to the wearer's line of sight. As can be seen in the figures, the mirror 509 is disposed substantially over the wearer's eye 512 associated with the beamsplitter 504, and the circuit board 510 is disposed at the other lateral end of the housing 501 which is above the wearer's other eye.

Figure 6:
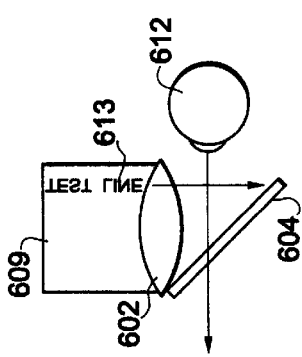
FIG. 6 shows a side view of how words 613 may be reflected onto beamsplitter 604 for viewing by an eye 612.

FIG. 6 shows a side view of the device depicting words reflected onto beamsplitter 604. The wearer's eye 612 can view the presentation, performance or surroundings through the partially reflective beamsplitter 604. Mirror 609 is disposed near one end of the housing to reflect words 613, which appear near the right edge of the mirror in various embodiments (i.e., display 511 of FIG. 5 is arranged to project the words sideways along an edge of the display). Words 613 are reflected downwardly through lens 602, which magnifies the words and focuses them onto beamsplitter 604, near the bottom of the beamsplitter. It will be appreciated that the sequence of words may be positioned anywhere on beamsplitter 604.

Figure 7:
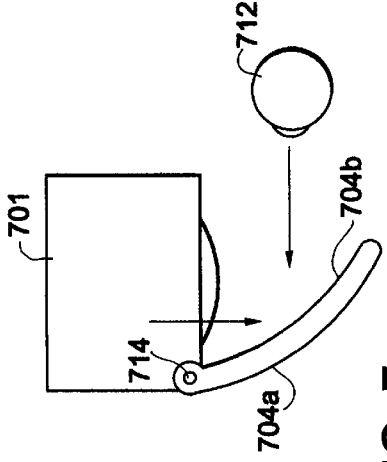
FIG. 7 shows an alternate embodiment in which the lens magnification an d beamsplitting functions a re performed by a beamsplitter having curved surfaces 704a and 704b.

FIG. 7 shows an alternate embodiment of a device in which the function performed by lens 602 is instead performed by a curved beamsplitter 704 having two surfaces 704a and 704b. In this embodiment, surface 704a may be curved to match the wearer's prescription, if any, and surface 704b may be curved to provide a magnification effect (i.e., a concave beamsplitter). A pivot 714 may be included to allow the user to pivot the beamsplitter forward and backward as needed to provide positioning adjustment.

In addition to the embodiments discussed above, the reflectivity of the beamsplitter may be varied across its surface to provide a greater contrast in the portion where the sequence of words appear. For example, increasing the reflectivity near the bottom of the beamsplitter would increase the contrast of the displayed words while allowing the viewer to substantially see through the upper portions of the beamsplitter. In this respect, it is possible to have essentially no reflectivity on the upper portions (or any other desired portions) of the beamsplitter, and only provide a reflective surface in the region where the words are to be displayed.

Additionally, contrast of the words may be increased by providing a dark block around the words on the display, much as closed captions are now generally presented in the television industry.

Instead of a single beamsplitter arranged to cover a single eye of the wearer, a "visor" type display may instead be provided. Additionally, dual displays could be provided, one for each eye, such that a single image of words could be split and separately presented to each eye. In such an embodiment, it may be desirable to provide separate focus controls for each eye.

Figure 8:
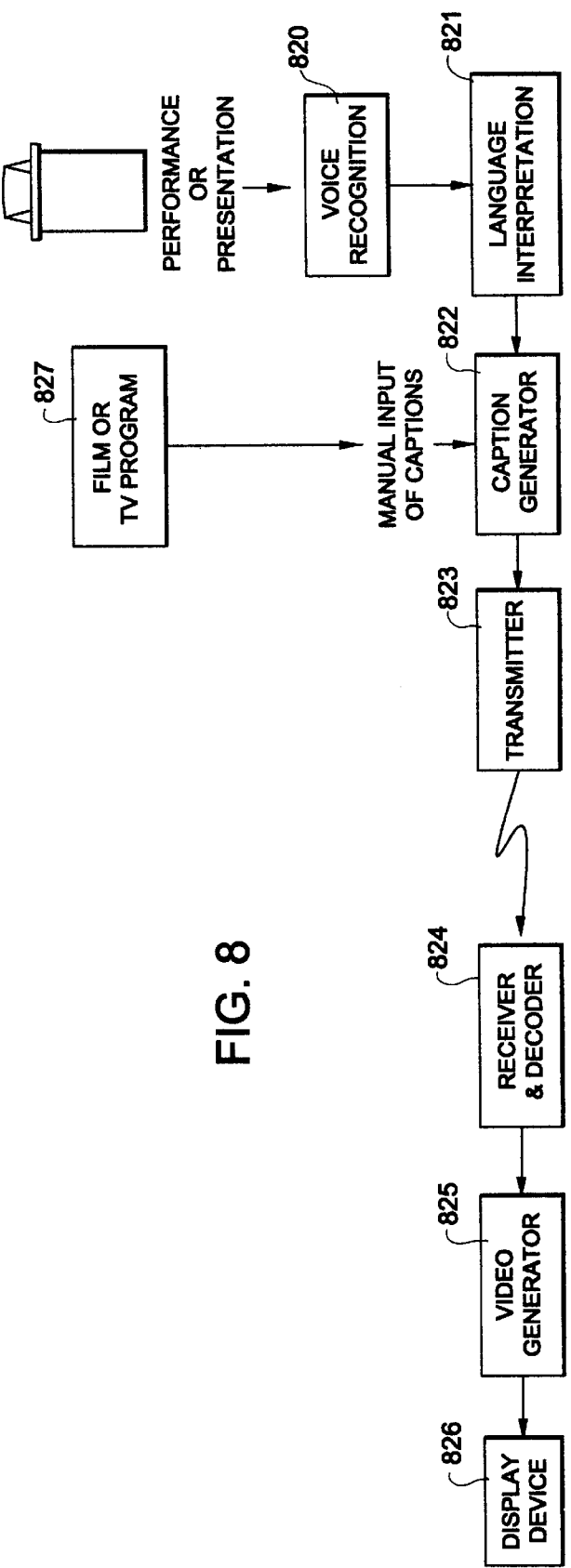
FIG. 8 shows a system incorporating a device according to the present invention.

FIG. 8 shows in block diagram form a system employing various principles of the present invention. A performance or presentation, such as a lecture, a live theater performance, a speech, or any other type of audiovisual presentation may be viewed by a person. An automatic speech recognition or voice recognition system 820 may be used to recognize words spoken by another person or contained in the aural presentation. Words output by speech recognition or voice recognition function 820 may be optionally interpreted into a different language by language interpretation function 821. A caption generator 822 may be used to generate captions (sequences of words corresponding to the presentation or performance) according to well known principles. Such captions may be generated either from language interpreter 821 or via manually generated captions prepared in conjunction with the presentation, or in conjunction with a film or TV program 827. Manual input of captions could also occur at the situs of the performance (e.g., at a lecture). It will be noted that the captions could be generated in advance and synchronized with a film or TV program instead of being generated in real time.

The generated captions may be transmitted through a transmitting function 823 such as via infrared or radio means to a receiver/decoder 824, which may include a modem and other well known components. A video generator 825 may be used to format the captions into a suitable display format, which is provided to display device 826. It will be noted that video generator 825 may be included in wearable control unit 217 (see FIG. 2), and display device 826 may correspond to wearable display device 230 (see FIG. 2). Variations of the system of FIG. 8 may be used in various ways. For example, a hearing-impaired student can use the display device in conjunction with the speech or voice recognition device 820 to participate in a classroom without the need for a human sign language interpreter. Alternatively, a person can view a presentation in a language different from that in which the presentation is being given. Other uses are of course possible.

It is apparent that many modifications and variations of the present invention are possible, and references to specific values are by example only. It is, therefore, to be understood that within the scope of the appended claims the invention may be practiced otherwise than as specifically described.

We claim:

1. A device for textually displaying a sequence of at least two spoken words into a field of view of a person, each textually displayed word comprising a plurality of characters, the device comprising:

a housing, said housing including a circuit for receiving a signal containing the textual sequence of words, a display for displaying the sequence of spoken words received by the circuit and transmitting light in a direction laterally transverse to the line of sight of an eye of the wearer, and a mirror mounted to downwardly reflect the displayed sequence of words;

a partially reflective beamsplitter, said partially reflective beamsplitter mounted to the housing and extending downwardly in front of the eye of the person, said partially reflective beamsplitter receiving the downwardly reflected sequence of words and projecting them into the field of view of the person, wherein the display is movably slidable along a path laterally perpendicular to the wearer's line of sight in order to adjust the words reflected on the beamsplitter; and a head interfacing support to be worn by the person for supporting the device on the person's head, said housing being attached to the support.

2. The device according to claim 1, wherein the head interfacing support includes an eyeglass frame.

3. The device according to claim 1, wherein the head interfacing support includes a headband adapted to be worn by and extend around the head of the person.

4. The device according to claim 1, wherein the display includes an LCD device.

5. The device according to claim 1, wherein the display includes an LED device.

6. The device according to claim 1, wherein the sequence of words comprises captions which correspond to speech spoken by another person.

7. The device according to claim 6, wherein the captions are in a language other than that spoken by the other person.

8. The device according to claim 1, further comprising a wearable control unit, the wireless control unit being coupled to the housing via a cable, said wearable control unit wirelessly receiving the sequence of words from a nearby location and transmitting the sequence of words to the housing through the cable.

9. The device according to claim 1, wherein said beamsplitter extends downwardly over only a single one of the two eyes of the wearer, the device not extending in front of the other eye of the wearer.

10. The device according to claim 1, wherein the words correspond to a narrated tour.

11. The device according to claim 1, wherein the reflectivity of the beamsplitter is higher in a region where the words are displayed than in other regions of the beamsplitter.

12. The device according to claim 1, wherein the beamsplitter is pivotally mounted to the housing.

13. The device according to claim 12, wherein the beamsplitter includes a surface curved in accordance with an eyeglass prescription particular to the person.

14. The device according to claim 1, wherein said housing further includes a lens disposed in the path of the mirror to magnify the displayed sequence of words reflected by the mirror.

15. The device according to claim 1, wherein the display includes one of an LCD device and an LED device, said housing further includes a lens disposed in the path of the mirror to magnify the displayed sequence of words reflected by the mirror, and wherein the housing includes a first portion disposed above the eye of the viewer associated with the beamsplitter and a second portion disposed above the other eye of the wearer, said mirror located in said first portion of the housing and said circuit being at least partially located in said second portion of the housing.

16. A device for textually displaying a sequence of at least two spoken words into a field of view of a person, each textually displayed word comprising a plurality of characters, the device comprising:
   a housing, said housing including a circuit for receiving a signal containing the textual sequence of words, a display for displaying the sequence of spoken words received by the circuit and transmitting light in a direction laterally transverse to the line of sight of an eye of the wearer, and a mirror mounted to downwardly reflect the displayed sequence of words;
   a partially reflective beamsplitter, said partially reflective beamsplitter mounted to the housing and extending downwardly in front of an eye of the person, for receiving the downwardly reflected sequence of words and projecting them into the field of view of the person;
   wherein the display is movably slidable relative to the remainder of the housing along a path substantially laterally and perpendicular to the wearer's line of sight in order to adjust the words reflected on the beamsplitter; and
   a head interfacing support to be worn by the person for supporting the device on the person's head, said housing being attached to the support.

17. The device according to claim 16, wherein the beamsplitter extends downwardly in front of only a single one of the two eyes of the wearer, the device does not extend in front of the other eye of the wearer.

18. The device according to claim 17, wherein said housing further includes a bottom portion, and a lens disposed on the bottom portion of the housing in the path of the mirror to magnify the displayed sequence of words reflected by the mirror.

19. The device according to claim 18, wherein the beamsplitter is pivotally mounted to the housing.

20. The device according to claim 16, wherein the reflectivity of the beamsplitter is higher in a region where the words are displayed than in other regions of the beamsplitter.

21. The device according to claim 16, wherein the head interfacing support includes an eyeglass frame.

22. A device for textually displaying a sequence of at least two spoken words into a field of view of a person, each textually displayed word comprising a plurality of characters, the device comprising:
   a housing, said housing including a circuit for receiving a signal containing the textual sequence of words, a display for displaying the sequence of spoken words received by the circuit and transmitting light in a direction laterally transverse to the line of sight of an eye of the wearer, and a mirror mounted to downwardly reflect the displayed sequence of words;
   a partially reflective beamsplitter, said partially reflective beamsplitter mounted to the housing and extending downwardly in front of the eye of the person, said partially reflective beamsplitter receiving the downwardly reflected sequence of words and projecting them into the field of view of the person, wherein the reflectivity of the beamsplitter is higher in a region where the words are displayed than in other regions of the beamsplitter; and
   a head interfacing support to be worn by the person for supporting the device on the person's head, said housing being attached to the support.

23. The device according to claim 22, wherein the head interfacing support includes an eyeglass frame.

24. The device according to claim 22, wherein the head interfacing support includes a headband adapted to be worn by and extend around the head of the person.

25. The device according to claim 22, wherein the display includes an LCD device.

26. The device according to claim 22, wherein the display includes an LED device.

27. The device according to claim 22, wherein the sequence of words comprises captions which correspond to speech spoken by another person.

28. The device according to claim 22, wherein the captions are in a language other than that spoken by the other person.

29. The device according to claim 22, further comprising a wearable control unit, the wireless control unit being coupled to the housing via a cable, said wearable control unit wirelessly receiving the sequence of words from a nearby location and transmitting the sequence of words to the housing through the cable.

30. The device according to claim 29, wherein said beamsplitter extends downwardly over only a single one of the two eyes of the wearer, the device not extending in front of the other eye of the wearer.

31. The device according to claim 30, wherein the words correspond to a narrated tour.

32. The device according to claim 22, wherein the beamsplitter is pivotally mounted to the housing.

33. The device according to claim 32, wherein the beamsplitter includes a surface curved in accordance with an eyeglass prescription particular to the person.

34. The device according to claim 33, wherein said housing further includes a lens disposed in the path of the mirror to magnify the displayed sequence of words reflected by the mirror.

35. The device according to claim 22, wherein the display includes one of an LCD device and an LED device, said housing further includes a lens disposed in the path of the mirror to magnify the displayed sequence of words reflected by the mirror, and wherein the housing includes a first portion disposed above the eye of the viewer associated with the beamsplitter and a second portion disposed above the other eye of the wearer, said mirror located in said first portion of the housing and said circuit being at least partially located in said second portion of the housing.

36. A device for textually displaying a sequence of at least two spoken words into a field of view of a person, each textually displayed word comprising a plurality of characters, the device comprising:
   a housing, said housing including a circuit for receiving a signal containing the textual sequence of words, a display for displaying the sequence of spoken words received by the circuit and transmitting light in a direction laterally transverse to the line of sight of an eye of the wearer, and a mirror mounted to downwardly reflect the displayed sequence of words;
   a partially reflective beamsplitter, said partially reflective beamsplitter mounted to the housing and extending downwardly in front of the eye of the person, said partially reflective beamsplitter receiving the downwardly reflected sequence of words and projecting them into the field of view of the person; and
   a head interfacing support to be worn by the person for supporting the device on the person's head, said housing being attached to the support;
   wherein the display includes one of an LCD device and an LED device, said housing further includes a lens disposed in the path of the mirror to magnify the displayed sequence of words reflected by the mirror, and wherein the housing includes a first portion disposed above the eye of the viewer associated with the beamsplitter and a second portion disposed above the other eye of the wearer, said mirror located in said first portion of the housing and said circuit being at least partially located in said second portion of the housing.

37. The device according to claim 36, wherein the head interfacing support includes an eyeglass frame.

38. The device according to claim 37, wherein the beamsplitter is pivotally mounted to the housing.

39. The device according to claim 38, wherein the beamsplitter includes a surface curved in accordance with an eyeglass prescription particular to the person.

40. The device according to claim 36, wherein the head interfacing support includes a headband adapted to be worn by and extend around the head of the person.

41. The device according to claim 36, wherein the sequence of words comprises captions which correspond to speech spoken by another person.

42. The device according to claim 41, wherein the captions are in a language other than that spoken by the other person.

43. The device according to claim 41, wherein the words correspond to a narrated tour.

44. The device according to claim 36, further comprising a wearable control unit, the wireless control unit being coupled to the housing via a cable, said wearable control unit wirelessly receiving the sequence of words from a nearby location and transmitting the sequence of words to the housing through the cable.

45. The device according to claim 36, wherein the display is movably slidable along a path laterally perpendicular to the wearer's line of sight in order to adjust the words reflected on the beamsplitter.

46. The device according to claim 45, wherein the reflectivity of the beamsplitter is higher in a region where the words are displayed than in other regions of the beamsplitter.

47. The device according to claim 45, wherein said beamsplitter extends downwardly over only a single one of the two eyes of the wearer, the device not extending in front of the other eye of the wearer.

* * * * *